United States Patent [19]

Meixner

[11] 4,100,794
[45] Jul. 18, 1978

[54] SYSTEM FOR MEASURING TORQUE AND SPEED OF ROTATING SHAFT

[75] Inventor: Edwin Joseph Meixner, Mount Prospect, Ill.

[73] Assignee: Borg-Warner Corporation, Chicago, Ill.

[21] Appl. No.: 747,577

[22] Filed: Dec. 6, 1976

[51] Int. Cl.² ............................................... G01L 3/24
[52] U.S. Cl. .............................. 73/136 A; 73/DIG. 2; 324/164
[58] Field of Search ...................... 73/136 A, DIG. 2; 324/164

[56] References Cited

U.S. PATENT DOCUMENTS

| 2,521,905 | 9/1950 | Feller | 73/136 A |
| 3,011,340 | 12/1961 | Dahle | 73/DIG. 2 |
| 3,274,826 | 9/1966 | Ingram | 73/136 R |
| 3,440,532 | 4/1969 | Chung | 324/164 |
| 3,656,815 | 4/1972 | Talebi et al. | 73/517 A |

*Primary Examiner*—Charles A. Ruehl
*Attorney, Agent, or Firm*—James J. Jennings, Jr.

[57] ABSTRACT

A transducer is provided for fitting over a rotating shaft to produce a magnetic field about the adjacent area of the shaft when the transducer is energized with an a-c voltage. The transducer includes secondary coils which provide an output signal that varies as a function of stresses developed by the loading of the rotating shaft. The transducer output signals are received by a signal processor which in turn provides output signals for indicating the torque, and/or speed of the shaft. In addition the sense of the torque and speed signals can be shown, and the torque and speed signals can be combined to indicate horsepower.

14 Claims, 9 Drawing Figures

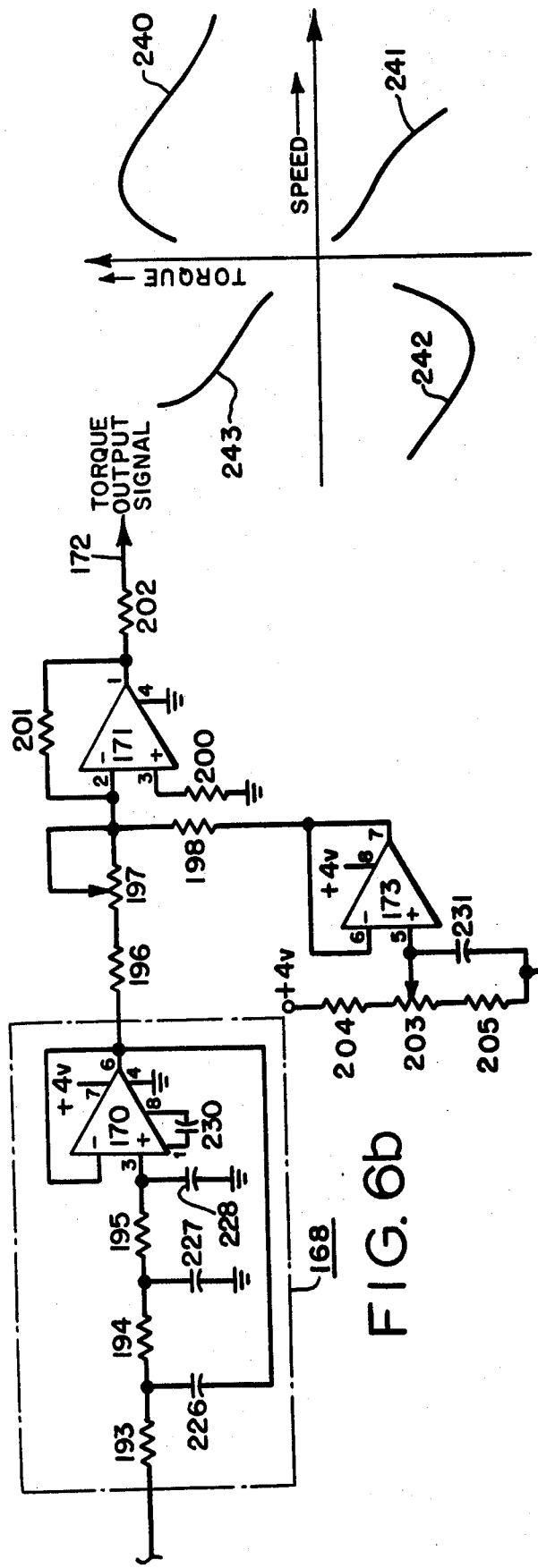
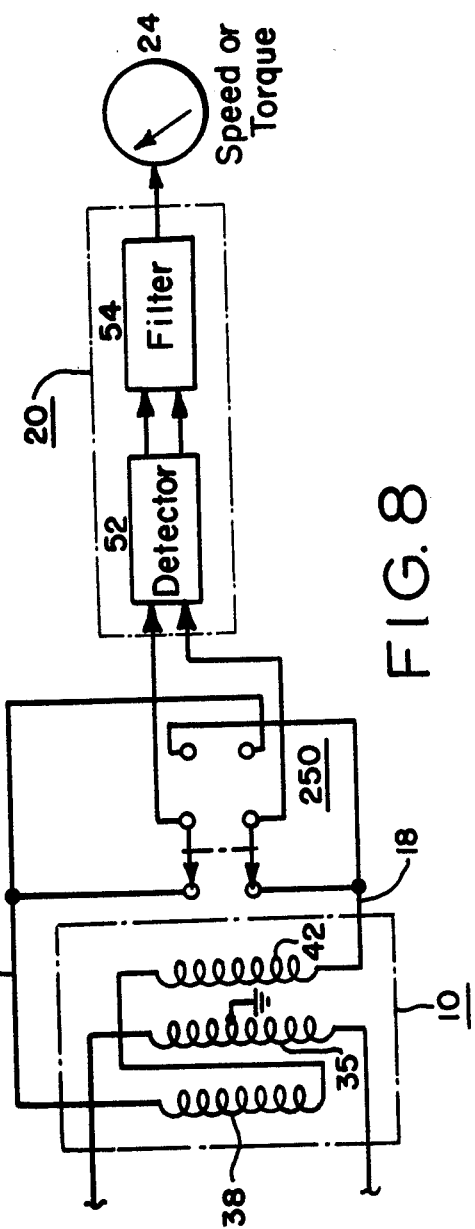
FIG.6b
FIG.7
FIG.8

SYSTEM FOR MEASURING TORQUE AND SPEED OF ROTATING SHAFT

BACKGROUND OF THE INVENTION

For some time it has been known that a magnetic field can be produced adjacent a permeable rotating shaft, and changes in that magnetic field can be detected by some means disposed adjacent the shaft. Thus when the shaft is loaded to provide output power to any suitable load, the shaft is stressed as a torque is developed at a certain speed of the shaft. This causes compression and tension in various portions of the shaft, which change the shaft permeability and thus vary the magnetic flux pattern. See, for example, the background explanation set out in U.S. Pat. No. 2,912,642 — Dahle. Different methods and structures were then developed to detect the changes in the resultant magnetic field to provide some measure of the torsional stresses in the rotating shaft. A further exposition of the early development is shown in U.S. Pat. No. 3,011,340 — Dahle. Even with these early teachings of the phenomenon itself and some devices for measuring changes in the magnetic field, there is still not an economical transducer assembly for use with a rotating shaft to provide both torque and output speed signals.

It is therefore a primary consideration of the present invention to provide a compact, economical transducer structure useful to indicate either torque or shaft output speed, or both, of a rotatable shaft.

A related object of the invention is to provide a signal processor circuit useful with such a transducer to provide the torque and/or shaft speed (rpm) signals.

Another important object of the invention is to provide such a signal processor circuit which indicates the sense of the torque and/or speed signals provided.

Yet another object of the invention is to provide such a signal processor circuit which also produces an indication of the horsepower developed by the shaft.

Another important object of the invention is to provide such a system in which the transducer is of rugged construction, suitable for use in a severe environment such as that experienced in the automotive industry where extremes of temperature, vibration and dirt are encountered.

SUMMARY OF THE INVENTION

The present invention includes a detecting and indicating system for providing both a first electrical signal which varies as a function of the torque applied to a rotatable shaft and a second electrical signal which varies as a function of the shaft speed. The system comprises a transducer including a first magnetic core assembly, having a generally circular outer portion and at least four radial pole pieces extending inwardly from the circular outer portion toward the outer surface of the rotatable shaft. This arrangement leaves room for the shaft to extend through the space defined by the ends of the pole pieces. A plurality of electrical windings is provided, with one winding disposed on each pole piece in the first magnetic core assembly, and all the windings are coupled in a first electrical circuit.

Second and third magnetic core assemblies are also provided, and both are substantially identical to the first magnetic core assembly. Each of these second and third assemblies also has a plurality of electrical windings respectively disposed on the individual pole pieces, and these windings are also in a series circuit. Each of the pole pieces in the second and third core assemblies is angularly offset with respect to the adjacent pole pieces in the first assembly; that is, each pole piece in the second and third core assemblies is disposed at an angular position midway between the adjacent pole pieces in the first core assembly. Means is provided for supplying an a-c signal to the electrical circuit, to provide an energizing flux from the first magnetic core assembly.

In accordance with the invention, a signal processor is provided. The signal processor includes a summing circuit coupled to the series circuit to produce the first electrical signal, and also includes a difference circuit coupled to the series circuit to produce the second electrical signal. Some means, such as one or more electrical meters, is coupled to the summing circuit and to the difference circuit for providing shaft torque and speed (rpm) information as the first and/or second electrical signals are received from the signal processor.

In accordance with another important aspect of the invention, a switch is provided between the oscillator means for supplying the a-c signal to the transducer, and the signal processor circuit. Actuation of the switch is effective to change some characteristic (such as the phase) of the a-c signal, with a resultant change in the sense of the output torque and/or speed signals. This enables the system to determine the sense of both the torque and shaft speed information produced by the system of this invention.

Yet another important aspect of the invention is the provision of a polarity reversal switch, coupled between the series circuit (transducer secondary windings) and the signal processor. Actuation of this switch is effective to reverse the polarity of the signal applied to the signal processor, thus enabling either torque or speed to be displayed on a single meter.

In accordance with another aspect of the invention, the signal processor can include a multiplier circuit coupled to both the summing circuit and to the difference circuit. This multiplier circuit produces a third electrical signal which varies as a function of the horsepower delivered by the shaft. Some means, such as a meter, is coupled to the multiplier circuit for providing horsepower information as the third electrical signal is received from the signal processor.

THE DRAWINGS

In the several figures of the drawings like reference numerals identify like components, and in those drawings:

FIGS. 6a and 6b are a schematic diagram of a detecting and indicating system particularly useful in an automotive or other system where power is not supplied by a conventional a-c power outlet but is derived from some auxiliary source;

FIG. 7 is a graph of torque vs. speed, useful in understanding the invention; and FIG. 8 is a block diagram of another embodiment of the invention.

DETAILED DESCRIPTION OF THE INVENTION

Figure 1:
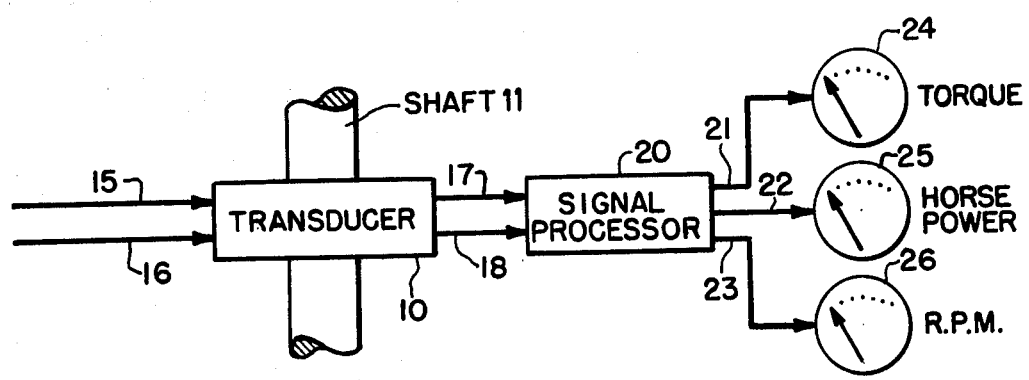
FIG. 1 is a block diagram of a detecting and indicating system constructed in accordance with this invention.

FIG. 1 depicts in a general manner the detecting and indicating system of this invention. As there shown a transducer 10 is positioned around a rotatable shaft 11. The means for driving the shaft and the load driven by the shaft are not indicated, as they are not important for understanding the invention. As will become apparent hereinafter, the transducer includes primary windings for producing a magnetic flux in the portion of shaft 11 adjacent the transducer. To energize the transducer primary windings, input a-c energy from a conventional 60 hertz, 110 volt line (not shown) can be applied over lines 15, 16. Of course d-c energy and an inverter (not shown) could also be used to supply an a-c exciting signal on lines 15, 16. An output signal from the transducer is passed over output conductors 17, 18 toward a signal processor circuit 20. Separate output conductors 21, 22 and 23 are provided to pass electrical signals to the respective meters 24 for indicating torque, 25 for depicting the horsepower, and 26 to indicate the speed or shaft rpm of the system. Those skilled in the art will appreciate that the term "means for providing an indication" need not refer to a visual illustration means such as a meter, but can be descriptive of a recording unit or other data-receiving instrument. In addition there need not be three separate conductors, or conductor pairs, to depict two or three output quantities. A single meter can be used to display different parameters in conjunction with a switch or multiplexer which is actuable to select different quantities from the signal processor circuit at different times for display or recording. However, the simplified arrangement of FIG. 1 provides an adequate understanding of the possible displays from the signal processor arrangement, without imposing any limitation or constraint on the invention by such a showing.

Figure 2:
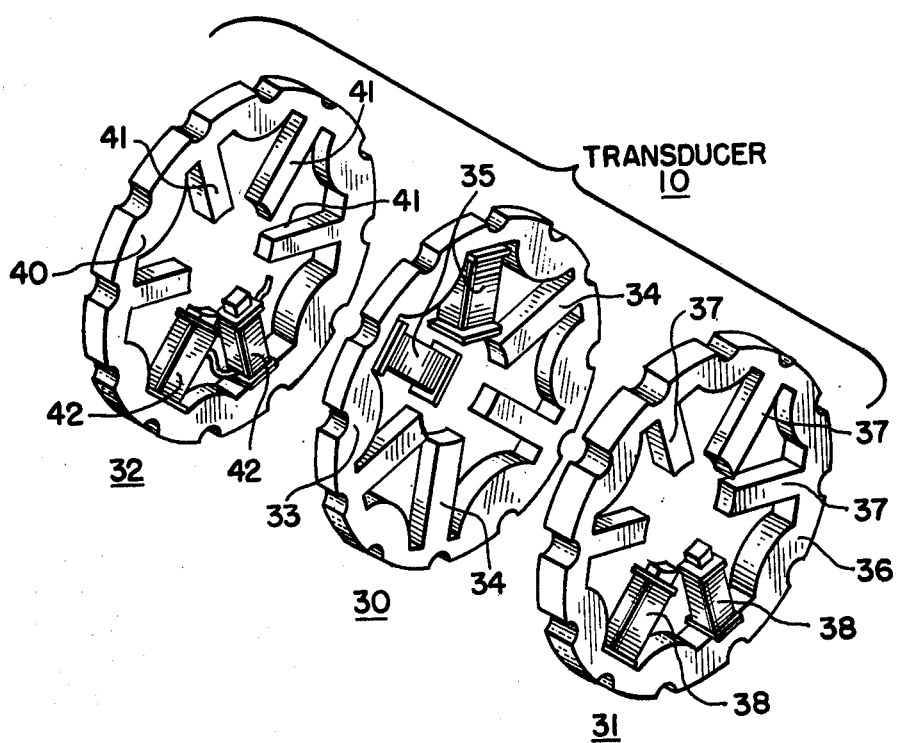
FIG. 2 is an exploded perspective view of certain components of the transducer assembly.

In the exploded view of FIG. 2, the three different core assemblies 30, 31 and 32 of the transducer 10 are shown. The first magnetic core assembly 30 includes a generally circular outer portion 33 and a plurality of radial pole pieces 34 extending inwardly to a position near the outer surface of the shaft when the transducer is mounted around the shaft as shown in FIG. 1. In one embodiment successfully built and tested the core assembly was provided of laminations approximately 1/64 inch in thickness of electrical grade (M15) steel. A plurality of electrical windings 35 are provided as shown, with one of the windings 35 being disposed around each of the six pole pieces 34. The primary windings on pole pieces 34 in one embodiment were comprised of No. 26 wire, with 160 turns on each of the pole pieces. The six individual windings were then connected in a complete electrical circuit as will be explained subsequently in connection with FIG. 3. The second and third magnetic assemblies 31 and 32 are generally similar to assembly 30. For example, the second assembly 31 also includes an outer portion 36 and a plurality of individual pole pieces 37, with individual windings 38 on the pole pieces. The third magnetic assembly 32 similarly includes an outer magnetic area 40, from which a plurality of individual pole pieces 41 extend inwardly toward the normal shaft position. The individual windings 42 are respectively disposed on the pole pieces 41 of the third assembly. In the embodiment successfully built and tested, the windings 38 and 42 were comprised of 200 turns on each pole piece, with either No. 32 or 34 wire. The specifications for the wire and the laminations are given by way of illustration only. Those skilled in the art will appreciate that other wire sizes and other laminations, or even a solid structure or a unit made from powdered metal by known techniques, can be used to form the magnetic circuits of the first, second and third assemblies. The individual core pieces are then positioned adjacent each other as shown. It is important to note that the pole pieces 37 and 41 in the second and third magnetic assemblies are each angularly offset with respect to the positions of the pole pieces 34 in the first magnetic assembly 30. That is, in the preferred embodiment, each of the pole pieces 37, 41 is positioned midway between two of the adjacent pole pieces 34 of the central or first magnetic assembly 30.

Figure 3:
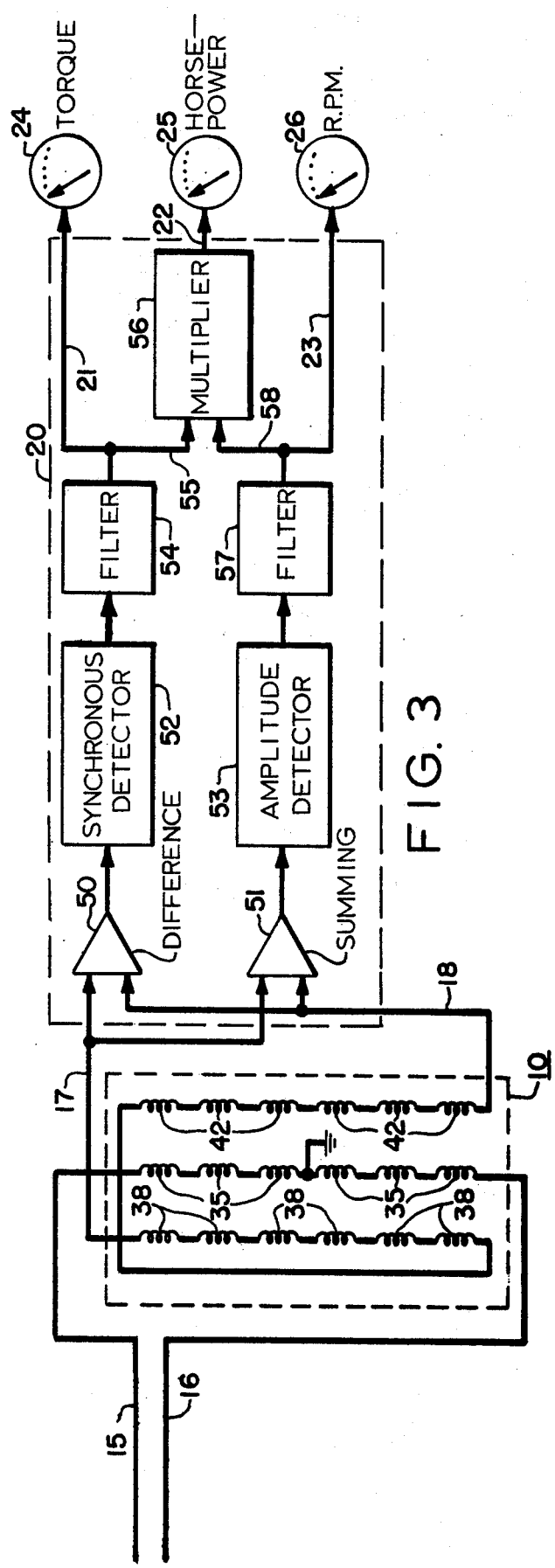
FIG. 3 is a block diagram, partly in schematic form, depicting additional details of the transducer and signal processor circuits.

FIG. 3 shows certain portions of the signal processor circuit 20 in block form, and further depicts the windings of the transducer 10 and their electrical connections. As is evident from FIG. 3, the windings 35 on the first magnetic core assembly form a primary winding, in effect, of the transducer assembly 10. The best mode now known for practicing the invention comprises intercoupling the coil windings very tightly in a bifilar manner, with the center tap connection in the primary winding as indicated. The secondary windings 38, 42 are individually coupled in series for each of the second and third magnetic assemblies, and then these two secondary windings are themselves coupled in series for connection to a summing amplifier 51 and a difference amplifier 50, at the input side of the signal processor circuit. The difference amplifier 50 in effect provides an output signal, which is related to the torque on the shaft 11, to the detector 52. The output signal from the summing amplifier 51, related to the speed or rpm of the shaft, is passed to another detector circuit 53. The torque signal is passed through a filter circuit 54, the output of which is applied over conductor 21 to torque-indicating meter 24 and, over conductor 55, to one input connection of a multiplier circuit 56. The output signal from the other filter 57, the input side of which is coupled to the amplitude detector 53, is passed both over conductor 23 to the rpm (speed) meter 26 and, over conductor 58, to the other input connection of multiplier stage 56. The multiplier circuit operates in a well known manner to provide an output signal which varies as a product of the two separate input signals. Accordingly, the signal provided by the multiplier stage 56 and passed over conductor 22 to the horsepower meter 25 is a true indication of the horsepower delivered by the shaft 11.

Figure 4:
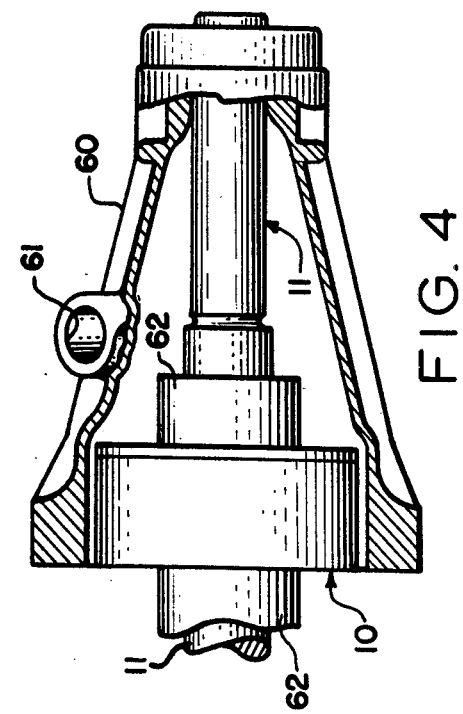
FIG. 4 is a side view, partly cut away, illustrating the mounting of a torque transducer on a rotatable shaft.

FIG. 4 shows the transducer 10 of the inventive system mounted over a portion of a shaft 11 which extends from a transmission housing 60. In a normal car mounting the right end of shaft 11 is coupled to a universal joint for delivering torque to the respective drive wheels in a vehicle. An opening 61 provided in the transmission extension housing is normally used to admit the cable for the speedometer connection (not shown). Transducer 10 is shown positioned on a bearing 62 for support and centering, but other mounting arrangements can be used. Thus it is apparent that the transducer and detecting system of this invention is readily mounted for use in a difficult environment, such as that normally found within the transmission extension housing of an automobile.

Figure 5:
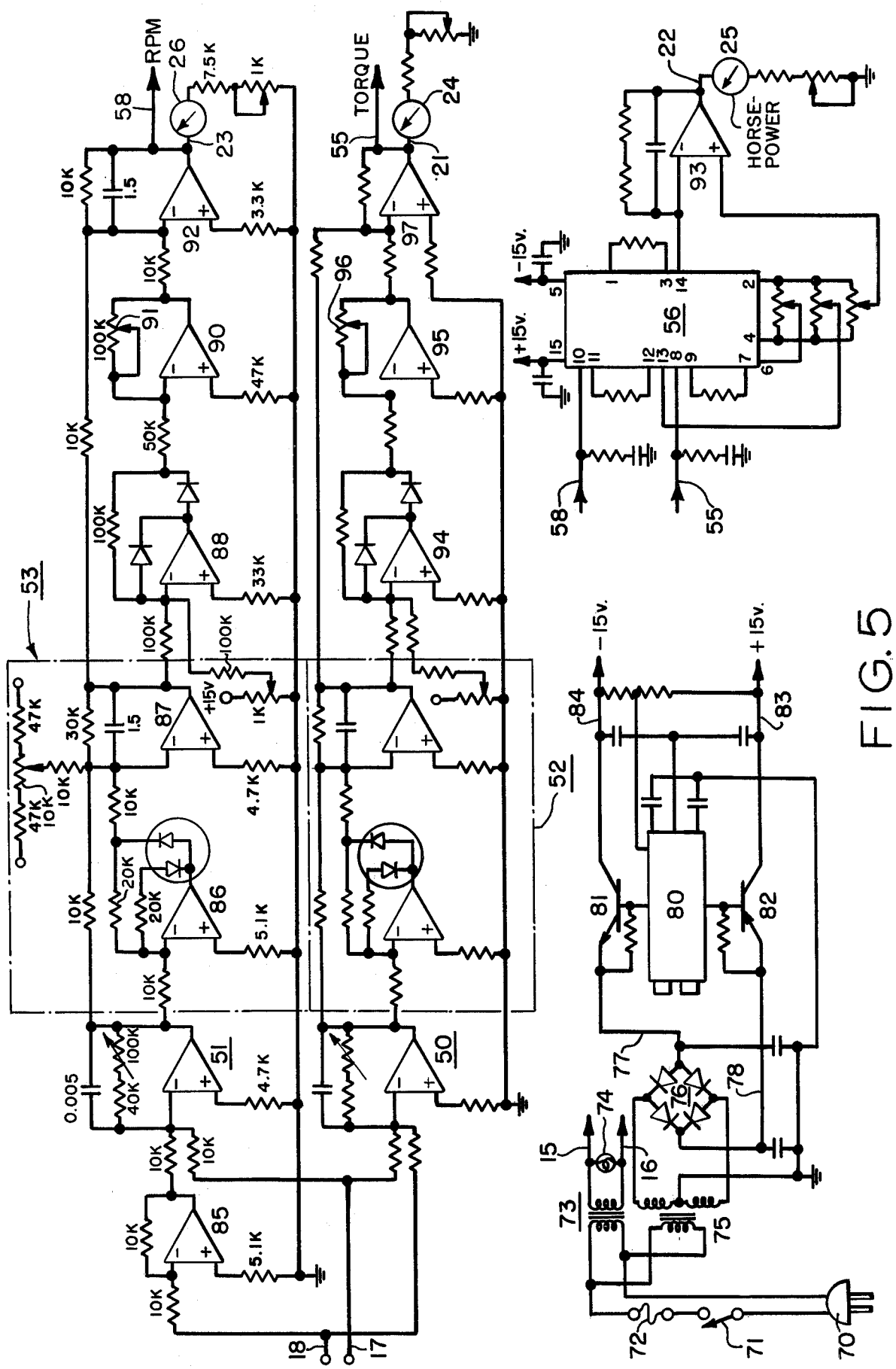
FIG. 5 is a schematic diagram of a detecting and indicating system for use with normal a-c line voltage.

FIG. 5 depicts a system for energizing the transducer 10 from an ordinary 60 hertz, 110 volt source by inserting plug 70 into a conventional wall socket (not shown). When this is done and switch 71 is closed, a-c energy is passed over fuse 72 and a first transformer 73 to provide a-c energy on lines 15, 16 for energizing the primary windings of the transducer. This energization is indicated by the illumination of pilot lamp 74. In addition the a-c input energy is passed over another transformer 75 and the diode rectifier bridge 76 to provide a d-c potential difference between the lines 77 and 78. A regulating circuit including an integrated circuit (IC) 80 and transistors 81, 82, is connected to provide a regulated plus 15 volts on line 83 and a negative 15 volts on line 84. In one embodiment the IC 80 was a 14686, but of course other suitable arrangements for providing a d-c potential difference to energize the signal processor circuit can readily be implemented.

The signal from the transducer secondary windings 38, 42 is received over lines 17 and 18, and applied through an inverter stage 85 to the summing amplifier 51, and is also applied to the difference amplifier circuit 50. The signal at the output of the summing amplifier 51 is applied to an absolute value full-wave detector circuit 53, which includes the amplifiers 86, 87 connected as shown. The output of the detector circuit is passed to a linearizing circuit 88, shown as a diode function generator. In turn, the output of stage 88 is applied to the gain adjust circuit 90, which includes a variable resistor 91 effective to regulate the amplitude of the signal passed to the output stage 92. Thus the output of stage 92 is passed over line 23 to the rpm - indicating meter 26, and is also passed over line 58 to the multiplier stage 56. In one embodiment the multiplier stage was a MC 1594L connected as shown, but those skilled in the art can readily implement multiplier arrangements for providing a suitable output signal over stage 93 and conductor 22 to the horsepower-indicating meter 25.

In an analogous manner, the transducer secondary signal on lines 17, 18 is also passed through the difference amplifier circuit 50, the other detector circuit 52, linearizing circuit 94, and gain adjust circuit 95 with its variable resistor 96 to the output driver stage 97, which in turn passes the torque-indicating signal both over line 21 to the torque meter 24 and, over line 55, supplies the torque-indicating signal to multiplier stage 56. The operation and interconnection of the stages shown in FIG. 5 will be evident to those skilled in the art from the explanation set out above. This second signal channel, for processing the torque information, is virtually identical to the first signal channel except that it does not include an inverter stage at its input connection.

While the circuit illustrated in FIG. 5 and the explanation of its operation will be apparent to those skilled in the art, it is based on a premise and technical appreciation clearly unobvious to those skilled in the art. That is, it is based upon (1) the discovery that an electrical signal can be derived from the transducer 10, which signal is in the nature of an armature reaction signal and is related to the shaft rpm, and (2) this signal can be processed to indicate shaft speed and, with the rpm signal, provide an indication of the torque. As will be described in connection with FIGS. 6a and 6b, an even more unobvious step has been achieved by providing means in the signal processor circuit by which the system can indicate whether the torque signal is of one sense (polarity) or another, and likewise indicate the sense of the speed signal. This means that the system can readily be constructed to indicate whether torque is being passed from a driving unit over the shaft to a load, or whether the load is in fact returning power over the shaft toward the power source. This occurs, for example, in a car when the car itself is acting as a braking force over the drive shaft to the engine. With such an arrangement a true four-quadrant indicating system is produced, in that both the positive and negative torque and speed signals can be provided.

Figure 6A:
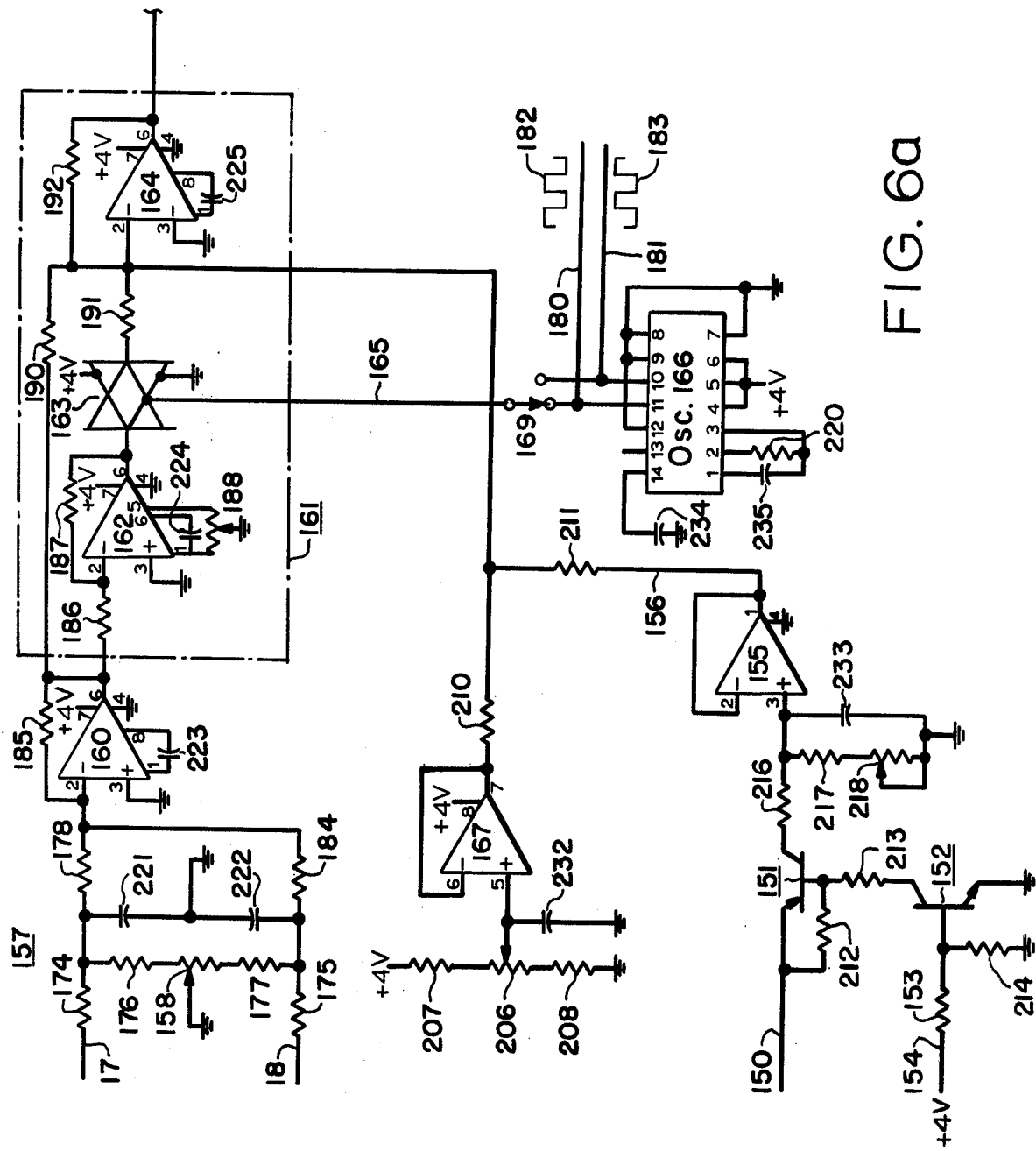

FIGS. 6a and 6b illustrate a signal processor particularly useful in an automotive application, in that it receives a positive 12 volt input over line 150 and utilizes that input energy to provide a regulated plus 4 volts and minus 4 volts in the power supply stage including transistors 151, 152. For purposes of this illustration, the ground symbol represents the negative 4 volt potential which is developed at the emitter of the NPN type transistor 152. The base of the same transistor is connected over a resistor 153 to a line 154, over which the plus 4 volt potential is supplied to the points indicated on the schematic diagram. In the embodiment illustrated, the PNP type transistor 151 was an MPS 6518, and the NPN type was an MPS 6514. The compensator stage 155 was connected to provide on line 156 a signal to compensate the torque output signal of the illustrated system for changes in the level of the battery input voltage, or other d-c voltage received over line 150.

In the upper left portion of FIG. 6a, the input signal from the secondary coils is received over lines 17, 18 and passed through an input balancing network 157. Adjustment of the movable arm of potentiometer 158 in this network effects the requisite balancing to compensate for any mis-match in the coils. The resultant compensated signal is then passed through an impedance buffer stage 160 to the synchronous detector 161. As shown the synchronous detector circuit comprises a first operational amplifier 162, an analog transmission-gate switch 163, and a second operational amplifier 164. The transmission-gate switch 163 is a unit which exhibits a very low impedance, of the order of 100 ohms, when it is "on" or rendered conductive by a logical 1 signal received over line 165 from an oscillator circuit 166. The switch 163 exhibits a very high impedance, of the order of the $10^{12}$ ohms, when a logical zero signal is applied over line 165. In the embodiment shown the transmission-gate switch 163 was a CD 4066, and the oscillator was a CD 4047 type unit. The oscillator provides a gate signal at the rate of 200 hertz, and this is also the frequency of the signal received from the secondary coils over lines 17, 18. An operational amplifier 167 was connected as shown as an adjusting stage, to take out any imbalance at the 200 hertz frequency which might otherwise be present in the synchronous detector circuit 161.

A filter circuit 168 is provided as shown, and includes an operational amplifier 170. The output signal from the filter arrangement was passed through another amplifier stage 171 to provide a torque-indicating signal on line 172 for application to the torque meter. Another operational amplifier 173 was connected as shown between filter 168 and stage 171, to provide for a calibration adjustment and remove any d-c component. The stages 167 and 173 represent a form of "insurance," to be certain that precise operation of the circuit can be achieved even if low quality components were utilized in the system. Thus the stages 167, 173 are not required for suitable operation of the system in a production embodiment.

As noted previously, oscillator 166 provides a timing signal over line 165 to regulate the analog transmission-gate switch 163. This signal is derived from pin 11 of the oscillator. A similar signal is produced at pin 10, but this signal is 180° out of phase with the signal at pin 11. These two phase-displaced signals are provided on lines 180, 181 and are represented by the waveforms 182, 183. These signals are used to drive a suitable inverter stage for supplying the energizing signal to the transducer primary windings.

FIG. 7 indicates the versatility of the present instrumentation system. With means such as the meters for depicting speed and torque, a speed-torque representation in four quadrants is developed as shown in FIG. 7. When used in conjunction with a motor vehicle, with the engine driving the output shaft and the vehicle traveling in the forward direction, the curve 240 in the first quadrant represents the speed-torque relationship. In the situation where the car is "coasting" downhill, the speed is still positive but the torque sign is reversed, and the resultant speed-torque relationship is represented by the curve 241 in the fourth quadrant. When the car is driven in reverse, both speed and torque are negative, and the speed-torque curve is that depicted as 242 in the third quadrant. The curve 243 in the second quadrant shows the speed-torque relationship under the conditions where the car is in reverse but coasting downhill. Such information may find more utility in heavy duty off-the-road vehicles such as buldozers, loaders, and so forth where these different situations are more frequently encountered.

FIG. 8 represents a system for depicting both the speed and torque output signals on an output meter 24 with a single detector 52 and only one filter 54 in the signal processor circuit. This is accomplished by placing switch means 250 between the secondary windings 38, 42 of the transducer 10 and the input side of the detector 52. As illustrated the switch can comprise a double pole, double throw switch for effectively reversing the polarity of the signal applied to the detector. This is analagous to providing the summing and difference amplifiers shown in the system of FIG. 3, where both signals are continually provided. Actuation of the switch 250 is effective to reverse the sense of the signal applied to the signal processor, and thus both speed and torque can be successively represented on a single meter 24. Those skilled in the art will appreciate that, although represented as a simple mechanical arrangement, switch means 250 can comprise a multiplex system for effectively providing the different polarity output signals at different times to the detector circuit. With a multiplex arrangement, another meter would be used to display the additional information. The precise switching arrangement may have different variations so long as it provides for the display of multiple information (such and speed and torque) with only a single channel in the processing arrangement.

Those skilled in the art will appreciate that there must be a slight axial separation between the magnetic core assemblies. At present it is believed that the separation between the first and second, and between the second and third, assemblies should be one-half the circular pitch. The circular pitch is defined as the circumference of the shaft (11) under test divided by the number of poles (6 in the illustrated embodiment) in the magnetic core assembly.

Likewise those skilled in the art will understand that which of the amplifiers 50, 51 (FIGS. 3 and 5) is connected as the summing amplifier, and which as the difference amplifier, depends upon the phase of the signal developed in the series circuit including secondary windings 38, 42 of the transducer. A phase-change switch, such as switch 169 in FIG. 6, can be incorporated to accommodate different connections of the windings 38, 42 during testing, but such a switch is not requisite in production models of the system.

TECHNICAL ADVANTAGES

The system of the invention described and claimed herein includes a transducer which is rugged, and obtains an output signal without the use of slip rings. The transducer itself is capable of operation over temperature extremes such as that encountered in an automotive environment. The detector reads the torque from the shaft directly, without requiring any modification of the shaft or insertion of special sections on the shaft. The transducer can be simply mounted within the transmission extension housing as described above in connection with FIG. 4.

Another advantage of the transducer in the system of this invention is that it cannot be overloaded by excess torque applied to the shaft itself. The unit is both compact and inexpensive to manufacture, and provides accuracy of a level which is very acceptable for use in automotive functions such as the indication of torque, speed and horsepower.

In addition the transducer of this invention not only provides the use with speed and/or torque indications, but additionally indicates the sense of the torque and speed signals.

In the appended claims the term "connected" means a d-c connection between two components with virtually zero d-c resistance between those components. The term "coupled" indicates there is a functional relationship between two components, with the possible interposition of other elements between the two components described as "coupled" or "intercoupled."

While only particular embodiments of the invention have been described and claimed herein, it is apparent that various modifications and alterations of the invention may be made. It is therefore the intention in the appended claims to cover all such modifications and alterations as may fall within the true spirit and scope of the invention.

What is claimed is:

1. An indicating system for providing information regarding the torque and the speed of a rotatable shaft, comprising:

a transducer, including a first magnetic core assembly having a plurality of electrical windings thereon, and means for coupling all the windings in a first electrical circuit, and second and third magnetic core assemblies, each substantially identical to the first magnetic core assembly, with each having a plurality of electrical windings thereon, and means for coupling such windings of the second and third magnetic core assemblies in a series circuit;

means for supplying an a-c signal to the electrical circuit, to provide an energizing flux from the first magnetic core assembly;

a signal processor, including a detector circuit, for producing an output signal related to at least one of the torque and speed parameters of the rotatable shaft;

means, coupled to the signal processor, for providing the shaft torque and/or speed information as the output signal is received from the signal processor; and switch means, coupled between the signal processor and the series circuit formed by the electrical windings on the second and third magnetic core assemblies, for determining whether the signal processor output signal connotes torque or speed information.

2. An indicating system for providing both a first electrical signal which varies as a function of the torque applied to a rotatable shaft and a second electrical signal which varies as a function of the shaft speed, comprising:

a transducer including a first magnetic core assembly, having a generally circular outer portion and at least four radial pole pieces extending inwardly from the circular outer portion toward the outer surface of the rotatable shaft, leaving room for the shaft to extend through the space defined by the ends of the pole pieces, a plurality of electrical windings, each of which is disposed on one of the pole pieces in the first magnetic core assembly, and means for coupling all the windings in a first electrical circuit, and second and third magnetic core assemblies, each substantially identical to the first magnetic core assembly, with each having a plurality of electrical windings respectively disposed on the individual pole pieces and means for coupling such windings of the second and third magnetic core assemblies in a series circuit, with each of the pole pieces in the second and third core assemblies being angularly offset with respect to the adjacent pole pieces in the first assembly such that each pole piece in the second and third core assemblies is disposed at an angular position midway between the adjacent pole pieces in the first core assembly;

means for supplying an a-c signal to the electrical circuit, to provide an energizing flux from the first magnetic core assembly;

a signal processor, including a summing circuit coupled to said series circuit to produce said second electrical signal, and a difference circuit coupled to said series circuit to produce said first electrical signal; and means, coupled to the summing circuit and to the difference circuit, for providing shaft torque and speed information as the first and second electrical signals are received.

3. An indicating system as claimed in claim 2, in which said signal processor further includes a multiplier circuit coupled to both the summing circuit and the difference circuit, which multiplier circuit produces a third electrical signal which varies as a function of the horsepower delivered by the shaft, and means, coupled to the multiplier circuit, for providing horsepower information as the third electrical signal is received.

4. An indicating system as claimed in claim 2, in which said signal processor further comprises a pair of absolute value full-wave detector circuits, one of which is coupled to the summing circuit and the other of which is coupled to the difference circuit, for providing an output signal related to the first and second electrical signals.

5. An indicating system as claimed in claim 4, in which said signal processor further comprises a pair of linearizing circuits, each of which is coupled to one of the full-wave detector circuits.

6. An indicating system as claimed in claim 5, in which said signal processor further comprises a pair of gain adjustment circuits, each of which is coupled to one of the linearizing circuits.

7. An indicating system as claimed in claim 2, in which said means for supplying an a-c signal includes conductor means suitable for connection to a conventional a-c supply, and a transformer, coupled between the conductor means and the electrical circuit comprising the windings in the first magnetic core assembly.

8. An indicating system as claimed in claim 7, and further comprising a rectifier bridge circuit, coupled to said conductors, for providing a d-c voltage to energize the circuits in the signal processor.

9. An indicating system for providing an electrical signal which varies as a function of the torque applied to a rotatable shaft, comprising:

a transducer including a first magnetic core assembly, having a generally circular outer portion and at least four radial pole pieces extending inwardly from the circular outer portion toward the outer surface of the rotatable shaft, leaving room for the shaft to extend through the space defined by the ends of the pole pieces, a plurality of electrical windings, each of which is disposed on one of the pole pieces in the first magnetic core assembly, and means for coupling all the windings in a first electrical circuit, and second and third magnetic core assemblies, each substantially identical to the first magnetic core assembly, with each having a plurality of electrical windings respectively disposed on the individual pole pieces and means for coupling such windings of the second and third magnetic core assemblies in a series circuit, with each of the pole pieces in the second and third core assemblies being angularly offset with respect to the adjacent pole pieces in the first assembly such that each pole piece in the second and third core assemblies is disposed at an angular position midway between the adjacent pole pieces in the first core assembly;

an oscillator to supply an a-c signal to the electrical circuit, to provide an energizing flux from the first magnetic core assembly;

a signal processor, including a synchronous detector circuit coupled to said series circuit to produce the torque-indicating electrical signal;

means, coupled to the synchronous detector circuit, for providing shaft torque information; and a power supply stage, having an input connection for receiving a d-c potential and an output connection for supplying a d-c potential to energize the circuits of the signal processor.

10. An indicating system as claimed in claim 9, and further comprising a compensating stage, coupled between the power supply stage and the signal processor circuits, to compensate the torque-indicating electrical signal for changes in the level of the d-c potential applied to the power supply stage.

11. An indicating system as claimed in claim 9, and further comprising a balancing network, coupled between the series circuit of the transducer and the input portion of the signal processor, including means adjustable to compensate for any mis-match in the transducer windings.

12. An indicating system as claimed in claim 9, and in which said synchronous detector includes a switch operable between low impedance and high impedance conditions, and means, coupled to the oscillator, for changing the state of the switch between the low impedance and high impedance conditions.

13. An indicating system as claimed in claim 12, in which said switch is an analog transmission-gate switch.

14. An indicating system as claimed in claim 9, and further comprising a filter circuit, coupled to the output side of the synchronous detector, to provide a filtered d-c torque-indicating signal.

* * * * *